United States Patent
Wadekar et al.

(10) Patent No.: US 10,240,240 B2
(45) Date of Patent: Mar. 26, 2019

(54) ENVIRONMENTALLY FRIENDLY CORROSION INHIBITORS FOR HIGH TEMPERATURE APPLICATIONS

(71) Applicant: HALLIBURTON ENERGY SERVICES, INC., Houston, TX (US)

(72) Inventors: Sushant Dattaram Wadekar, Pune (IN); Vandana Neeraj Pandey, Pune (IN); Gulam Jahangeer Hipparge, Pune (IN)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 37 days.

(21) Appl. No.: 15/309,971

(22) PCT Filed: Jul. 31, 2014

(86) PCT No.: PCT/US2014/049183
§ 371 (c)(1),
(2) Date: Nov. 9, 2016

(87) PCT Pub. No.: WO2016/018376
PCT Pub. Date: Feb. 4, 2016

(65) Prior Publication Data
US 2017/0233872 A1    Aug. 17, 2017

(51) Int. Cl.
 *C23F 11/04* (2006.01)
 *C09K 8/54* (2006.01)
 *E21B 41/02* (2006.01)
 *C23F 11/12* (2006.01)
 *E21B 43/25* (2006.01)

(52) U.S. Cl.
 CPC .............. *C23F 11/04* (2013.01); *C09K 8/54* (2013.01); *C23F 11/122* (2013.01); *E21B 41/02* (2013.01); *E21B 43/25* (2013.01)

(58) Field of Classification Search
None
See application file for complete search history.

(56) References Cited

U.S. PATENT DOCUMENTS

| | | | |
|---|---|---|---|
| 5,854,180 A | 12/1998 | Scherubel et al. | |
| 2003/0176288 A1* | 9/2003 | Cizek | C09K 8/54 507/100 |
| 2010/0087340 A1 | 4/2010 | Cassidy et al. | |
| 2013/0112106 A1 | 5/2013 | Malwitz et al. | |

FOREIGN PATENT DOCUMENTS

WO    WO 2010119235    10/2010

OTHER PUBLICATIONS

Andijani et al., "Corrosion behavior of titanium metal in the presence of inhibited sulfuric acid at 50° C.," Desalination, Jun. 10, 2000; pp. 45-51, vol. 129(1).
International Search Report and Written Opinion for International Application No. PCT/US2014/049183 dated Apr. 30, 2015. (14 pages).

* cited by examiner

Primary Examiner — Jeffrey D Washville
(74) Attorney, Agent, or Firm — Haynes and Boone, LLP

(57) ABSTRACT

Methods of inhibiting corrosion of metal surfaces by aqueous acids are described. The methods include combining an effective amount of a corrosion inhibitor composition with an aqueous acid solution to form an inhibited acid solution and contacting a metal surface with the inhibited acid solution. The corrosion inhibitor composition includes an aromatic ketone or a salt thereof.

16 Claims, No Drawings

ENVIRONMENTALLY FRIENDLY CORROSION INHIBITORS FOR HIGH TEMPERATURE APPLICATIONS

BACKGROUND

The present invention relates generally to methods of inhibiting the corrosion of metal surfaces by aqueous acids in high temperature oil and gas operations.

Subterranean hydrocarbon containing formations penetrated by well bores are often treated with aqueous acids to stimulate the production of hydrocarbons therefrom. One such treatment, generally referred to as "acidizing" involves the introduction of an aqueous acid solution into a subterranean formation under pressure so that the acid solution flows through the pore spaces of the formation. The acid reacts with acid soluble materials contained in the formation thereby increasing the size of the pore spaces, thus increasing the permeability of the formation. Another production stimulation treatment known as "fracture-acidizing" involves the formation of one or more fractures in the formation and the introduction of an aqueous acid solution into the fractures to etch the fracture faces whereby channels are formed therein when the fractures close. The acid also enlarges the pore spaces in the fracture faces and in the formation.

Acidizing and fracture-acidizing solutions typically contain, for example, 15% to 28% by weight of hydrochloric acid, which can cause corrosion of metal surfaces in pumps, tubular goods and equipment used to introduce the aqueous acid solutions into the subterranean formations to be treated. The expense associated with repairing or replacing corrosion damaged tubular goods and equipment can be problematic. The corrosion of tubular goods and down-hole equipment is increased by the elevated temperatures encountered in deep formations, and the corrosion results in at least the partial neutralization of the acid before it reacts with acid-soluble materials in the formations, which leads to added expense and complications because additional quantities of the acid often are required to achieve the desired result.

Aqueous acid solutions are also utilized in a variety of other industrial applications to contact and react with acid soluble materials. In such applications, metal surfaces are contacted with the acid and any corrosion of the metal surfaces is highly undesirable. In addition, other corrosive fluids such as aqueous alkaline solutions, heavy brines, petroleum streams containing acidic materials and the like are commonly transported through and corrode metal surfaces in tubular goods, pipelines and pumping equipment.

A variety of metal corrosion inhibiting additives have been developed for aqueous acid fluids. Many of them, however, are considered environmentally objectionable, toxic to humans, and/or flammable. In addition, these metal corrosion inhibiting additives typically are designed for low temperature applications. The acid corrosion rate, however, increases with increasing temperature. Thus, there is a continuing need for improved and more environmentally benign methods and compositions for inhibiting acid corrosion in high temperature oil and gas operations.

DETAILED DESCRIPTION

According to several exemplary embodiments, a method is provided for the inhibition of acid corrosion of a metal surface using environmentally friendly aromatic ketones or the salts thereof. The aromatic ketones are formulated into environmentally friendly corrosion inhibitor compositions that act by either forming a protective coating on the metal surface or passivating the metal surface. One of the many advantages associated with use of the corrosion inhibitor compositions is that they have the potential to be used as corrosion inhibitors in locations that are subject to environmental regulations, such as the North Sea. Moreover, the corrosion inhibitor compositions are effective at hydrochloric acid (HCl) concentrations of 15% by weight at temperatures up to about 300° F. In several exemplary embodiments, the corrosion inhibitor compositions can be used in acidizing operations for carbonate reservoirs with bottom hole temperatures (BHT) of at least up to 300° F. with 15% HCl.

The aromatic ketones used in several exemplary compositions and methods have the following structure:

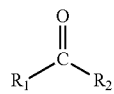

wherein $R_1$ is an aromatic ring substituted at one or both meta positions with an alkyl group having 1-12 carbons and $R_2$ is a cyclic alkane substituted with at least one amine group in or on the cyclic alkane. In several exemplary embodiments, $R_1$ is a phenyl group substituted with an ethyl group at one meta position. In several exemplary embodiments, $R_2$ is a cyclohexane substituted with a methyl amino group. For example, the aromatic ketone in the corrosion inhibitor compositions may be ethyl phenyl keto cyclohexyl amino hydrochloride (shown below):

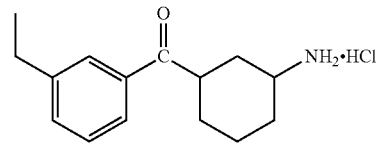

Ethyl phenyl keto cyclohexyl amino hydrochloride is commercially available as a blend of β-(ethyl phenyl keto cyclohexyl) amino hydrochloride, formaldehyde, cinnamaldehyde, and methanol.

According to several exemplary embodiments, the aromatic ketone is present in the corrosion inhibitor compositions in an amount of from about 0.01% to about 99.99% by weight of the composition. According to several exemplary embodiments, the aromatic ketone is present in the corrosion inhibitor compositions in an amount of from about 2.0% to about 40.0% by weight of the composition. According to several exemplary embodiments, the aromatic ketone is present in the corrosion inhibitor compositions in an amount of from about 5.0% to about 40.0% by weight of the composition. According to several exemplary embodiments, the aromatic ketone is present in the corrosion inhibitor compositions in an amount of from about 10.0% to about 20.0% by weight of the composition.

According to several exemplary embodiments, the corrosion inhibitor compositions may additionally contain cinnamaldehyde, formaldehyde, methanol, or mixtures thereof. According to several exemplary embodiments, the corrosion inhibitor compositions are substantially free (e.g., less than 0.1 percent by weight) or entirely free of acetylenic alcohols. Acetylenic alcohols are widely used for high temperature applications, but are toxic to the environment and cannot typically be used in environmentally sensitive areas like the North Sea.

According to several exemplary embodiments, the corrosion inhibitor compositions include an iodide source such as potassium iodide, sodium iodide, and iodine; surfactants such as linear alcohol ethoxylates, amine alcohol ethoxylates, and ethoxylated amides; and solvents such as methyl alcohol, ethyl alcohol, isopropyl alcohol, ethylene glycol, propylene glycol, dimethyl formamide, N-methyl pyrrolidone, propylene glycol methyl ether and butyl cellosolve. According to several exemplary embodiments, when a solvent is included in the corrosion inhibitor compositions, it is generally present in an amount in the range of from about 1% to about 40% by weight of the composition.

According to several exemplary embodiments, the corrosion inhibitor compositions include one or more quaternary ammonium compounds, one or more corrosion inhibitor intensifiers and other components commonly utilized in corrosion inhibiting formulations such as Mannich condensation products formed by reacting an aldehyde, a carbonyl containing compound and a nitrogen containing compound, unsaturated carbonyl compounds, unsaturated ether compounds, formamide, formic acid, formates, and other sources of carbonyl, iodides, terpenes, and aromatic hydrocarbons.

According to several exemplary embodiments, quaternary ammonium compounds are included in the corrosion inhibitor compositions such as N-alkyl, N-cycloalkyl and N-alkylarylpyridinium halides such as N-cyclohexylpyridinium bromide or chloride, N-alkyl, N-cycloalkyl and N-alkylarylquinolinium halides such as N-dodecylquinolinium bromide or chloride. According to several exemplary embodiments, when a quaternary ammonium compound is included in the corrosion inhibiting composition, it is generally present in an amount of from about 0.1% to about 45% by weight of the composition.

Corrosion inhibitor intensifiers function to activate corrosion inhibitor components so that they function as corrosion inhibitors. According to several exemplary embodiments, the corrosion inhibitor composition includes a corrosion inhibitor intensifier such as metal ions, iodide ions, or certain organic compounds. Examples of such corrosion inhibitor intensifiers are cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of the foregoing intensifiers such as a mixture of formic acid and potassium iodide. According to several exemplary embodiments, the corrosion inhibitor intensifier includes commercially available corrosion inhibitor intensifiers such as HII-124F™, HII-124-B™, and/or HII-124-C™, marketed by Halliburton Energy Services, Inc. According to several exemplary embodiments, when a corrosion inhibitor intensifier is included in the corrosion inhibiting composition, it is generally present in an amount of from about 0.1% to about 40.0% by weight of the composition.

According to several exemplary embodiments, the method of inhibiting the corrosion of metal surfaces by an aqueous acid solution includes combining a corrosion inhibitor composition with an aqueous acid solution to form an inhibited acid solution and then contacting a metal surface with the inhibited acid solution.

According to several exemplary embodiments, the corrosion inhibitor composition is combined with the aqueous acid solution in an amount of from about 0.02% to about 20.0% by volume of the aqueous acid solution. According to several exemplary embodiments, the corrosion inhibitor composition is combined with the aqueous acid solution in an amount of from about 0.2% to about 2.0% by volume of the aqueous acid solution.

The metals that can be protected from corrosion by the corrosion inhibiting methods and compositions of the present invention include, but are not limited to, steel grade N-80, J-55, P-110, QT800, HS80, and other common oil field alloys such as 13Cr, 25Cr, Incoloy 825 and 316L.

According to several exemplary embodiments, the acids in the aqueous acid solutions in which the corrosion inhibiting methods and compositions are effective include, but are not limited to, HCl, acetic acid, formic acid, hydrofluoric acid, and mixtures of these acids. In some embodiments, the aqueous acid solution includes an acid or mixture of acids in an amount up to about 32% by weight thereof. In some embodiments, the acid is HCl and is present in the aqueous acid solution in an amount of from about 3% to about 33% by weight. In several exemplary embodiments, the acid is HCl and is present in the aqueous acid solution in an amount of about 15% by weight.

In practice, corrosion rates generally tend to increase with increasing acid concentration and with increasing temperature. According to several exemplary embodiments, the corrosion inhibitor compositions provide corrosion inhibition of metal surfaces at HCl concentrations of 15% and at temperatures up to about 300° F.

The following examples are illustrative of the compositions and methods discussed above and are not intended to be limiting.

EXAMPLE 1

Corrosion Testing

A common mode of testing the effectiveness of a corrosion inhibitor involves simulating downhole corrosive conditions by using an autoclave and measuring corrosion rates. Corrosion rates were determined using one metallurgy (P-110 pipes) in a simulated treatment fluid of an aqueous mixture of 15% HCl at various temperatures. A solution of treatment fluid was added to a selected amount of an ethyl phenyl keto cyclohexyl amino hydrochloride corrosion inhibitor. For instance, for preparing 100 ml of 15% HCl, 39 ml of concentrated HCl was added to 61 ml. of water. The amount of the corrosion inhibitor was then deducted from the amount of water. For example, to prepare the 20 gal/1000 gal (2%) corrosion inhibitor in 15% HCl solution noted in Table 1 below, the composition included 59 ml water, 2 ml corrosion inhibitor and 39 ml concentrated HCl (35%). External corrosion inhibitor intensifiers were also added to the treatment fluid as indicated. The P-110 coupons were then suspended in the inhibited acid mixtures and these mixtures were then placed in a high temperature and high pressure corrosion autoclave unit simulator. The coupons remained in the autoclave for the indicated temperatures for 3 hours. The coupons were then removed, cleaned, and weighed to obtain their weight loss. The corrosion value is reported in lb/ft$^2$. The results of the tests are provided below in Table 1.

TABLE I

| Test No. | Temperature (° F.) | Time (hours) | Ethyl phenyl keto cyclohexyl amino hydrochloride corrosion inhibitor (gal/1000 gal) | Corrosion inhibitor Intensifier | Corrosion Loss (lb/ft$^2$) |
|---|---|---|---|---|---|
| 1 | 200 | 3 | None | — | 0.27 |
| 2 | 200 | 3 | 2 | — | 0.0024 |
| 3 | 275 | 3 | 20 | — | 0.037 |
| 4 | 300 | 3 | 20 | — | 0.23 |
| 5 | 300 | 3 | 20 | Formic acid (40 gal/1000 gal) | 0.030 |

As shown in the results, the ethyl phenyl keto cyclohexyl amino hydrochloride corrosion inhibitor is effective at temperatures ranging from 200° F. up to 300° F. for 3 hours in 15% HCl aqueous solutions. The addition of the ethyl phenyl keto cyclohexyl amino hydrochloride corrosion inhibitor to the aqueous acid solution at 200° F. significantly improved corrosion loss. It additionally demonstrated synergism with environmentally friendly corrosion inhibitor intensifiers like formic acid. Thus, the ethyl phenyl keto cyclohexyl amino hydrochloride corrosion inhibitor meets current market demand for acidizing operations for carbonate reservoirs with BHT of 300° F. using 15% HCl.

Although only a few exemplary embodiments have been described in detail above, those of ordinary skill in the art will readily appreciate that many other modifications are possible in the exemplary embodiments without materially departing from the novel teachings and advantages of the present invention. Accordingly, all such modifications are intended to be included within the scope of the present invention as defined in the following claims.

What is claimed is:

1. A method of inhibiting corrosion of metal surfaces by aqueous acids comprising:
    combining an effective amount of a corrosion inhibitor composition with an aqueous acid solution to form an inhibited acid solution, the corrosion inhibitor composition consisting of:
    (i) an aromatic ketone or a salt thereof having the structure:

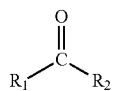

wherein $R_1$ is an aromatic ring substituted at one or both meta positions with an alkyl group having 1-12 carbons and $R_2$ is a cyclic alkane substituted with at least one amine group in or on the cyclic alkane,
    (ii) formaldehyde,
    (iii) cinnamaldehyde,
    (iv) methanol, and
    (v) formic acid; and
    contacting a metal surface with the inhibited acid solution.

2. The method of claim 1, wherein the aromatic ketone comprises ethyl phenyl keto cyclohexyl amino hydrochloride.

3. The method of claim 1, wherein the corrosion inhibitor composition comprises about 0.01 to about 99.9 weight percent of the aromatic ketone.

4. The method of claim 3, wherein the corrosion inhibitor composition comprises about 2.0 to about 40.0 weight percent of the aromatic ketone.

5. The method of claim 4, wherein the corrosion inhibitor composition comprises about 5.0 to about 30.0 weight percent of the aromatic ketone.

6. The method of claim 5, wherein the corrosion inhibitor composition comprises about 10.0 to about 20.0 weight percent of the aromatic ketone.

7. The method of claim 1, wherein the aqueous acid solution comprises hydrochloric acid.

8. The method of claim 7, wherein the aqueous acid solution comprises about 3 weight percent to about 33 weight percent hydrochloric acid.

9. The method of claim 8, wherein the aqueous acid solution comprises about 15 weight percent hydrochloric acid.

10. The method of claim 1, wherein the corrosion inhibitor composition comprises about 0.1 to 40.0 weight percent of the formic acid.

11. The method of claim 1, wherein the metal surface comprises a P-110 steel.

12. The method of claim 1, wherein the inhibited acid solution contacts the metal surface at temperatures up to about 300° F.

13. The method of claim 12, wherein the inhibited acid solution contacts the metal surface in an acidizing operation for a carbonate reservoir.

14. The method of claim 1, wherein the inhibited acid solution exhibits a metal corrosion rate of less than 0.1 lb/ft$^2$ for 3 hours at 300° F.

15. The method of claim 14, wherein the inhibited acid solution exhibits a metal corrosion rate of less than 0.05 lb/ft$^2$ for 3 hours at 300° F.

16. The method of claim 15, wherein the inhibited acid solution exhibits a metal corrosion rate of about 0.03 lb/ft$^2$ for 3 hours at 300° F.

* * * * *